March 26, 1935.  J. D. MacLACHLAN  1,996,023
ELECTRIC MOTOR
Filed June 29, 1933  3 Sheets-Sheet 1

INVENTOR.
J. D. MacLachlan
BY
Thorpe & Thorpe ATTORNEYS.

March 26, 1935.  J. D. MacLACHLAN  1,996,023
ELECTRIC MOTOR
Filed June 29, 1933    3 Sheets-Sheet 2
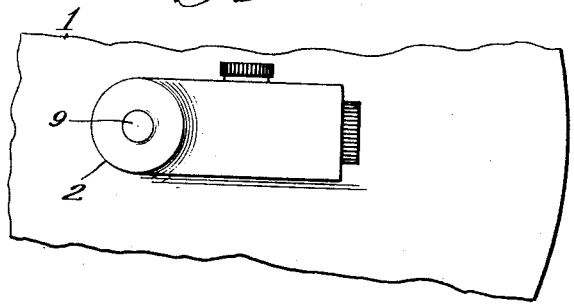
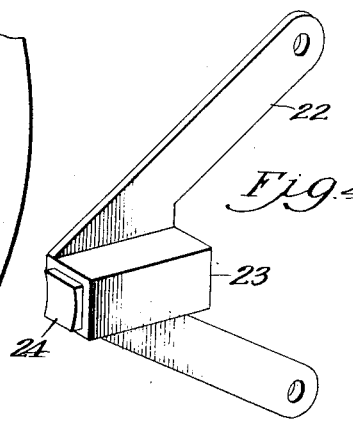
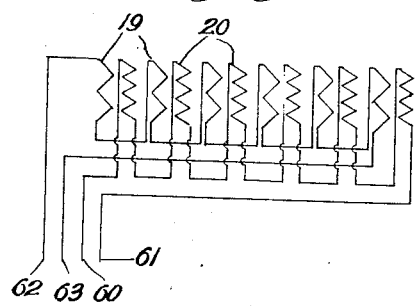
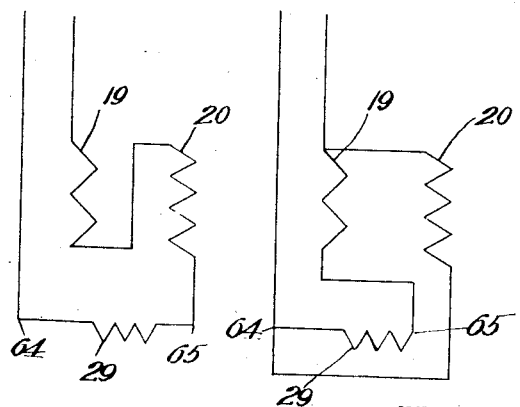
INVENTOR.
J. D. MacLachlan
BY
Thorp & Thorp ATTORNEYS.

March 26, 1935.  J. D. MacLACHLAN  1,996,023
ELECTRIC MOTOR
Filed June 29, 1933  3 Sheets-Sheet 3

INVENTOR.
J. D. MacLachlan
BY
Thorpe & Thorpe ATTORNEYS.

Patented Mar. 26, 1935

1,996,023

UNITED STATES PATENT OFFICE 1,996,023

ELECTRIC MOTOR

John D. MacLachlan, Kansas City, Mo., assignor to Mac Ad Company, Kansas City, Mo., a corporation of Missouri Application June 29, 1933, Serial No. 678,168

4 Claims. (Cl. 172—36)

This invention relates to universal motors and my general object is to produce a motor which will have relatively constant speed on either A. C. or D. C. current of the same voltage, when the circuit connections are made in a predetermined manner, regardless of the load, the object being accomplished by the production of a construction in which the stator is divided into a multiplicity of sets of field poles arranged in groups of the same polarity, but preferably of different resistance, whereby it is possible to use the entire stator windings in series with the rotor when operating on D. C., and then, when desiring to operate on A. C., to shunt one or more groups of field poles, as will hereinafter appear. By properly proportioning the windings, a universal motor is thus produced, which operates at substantially the same speed and power output with direct current and with alternating current of the rated voltage.

Another object of the invention is to produce a construction in which the rotor coils are independent of each other and are readily accessible for replacement or repair without necessitating interference with other coils, making it possible to use solid iron cores with a consequent material saving in cost of manufacture, although, of course, laminated coils may be employed where found desirable.

A still further object of the invention is to produce a spool wound rotor in order that the large volume of magnetically non-effective wire at the ends of the rotor as in the ordinary type of drum winding, shall be avoided. In the ordinary drum winding substantially 20% to 30% of the winding is at the opposite ends of the rotor.

Another object of the invention is to produce a motor which is cheaper to manufacture and less expensive to repair than standard motors, and which will not overheat when in service.

A still further object of the invention is to produce an electric motor of new construction which is adapted for use in a confined space and is equipped with a force feed lubrication system requiring but infrequent attention.

With the general objects named in view, and others as will hereinafter appear, the invention consists in certain novel and useful features of construction and organization of parts as hereinafter described and claimed; and in order that it may be fully understood, reference is to be had to the accompanying drawings, in which:—

Figure 3 is a fragmentary side elevation of the closed end of the electric motor.

Figure 4 is a perspective view of one of the brush holders.

Figure 5 is a diagrammatic view of one method of connecting the multi-field coils in separate series.

Figure 6 is a diagrammatic view of a straight series connection for running on D. C. current.

Figure 7 is a diagrammatic view of a series-shunt connection for running on A. C. current.

Figure 1:
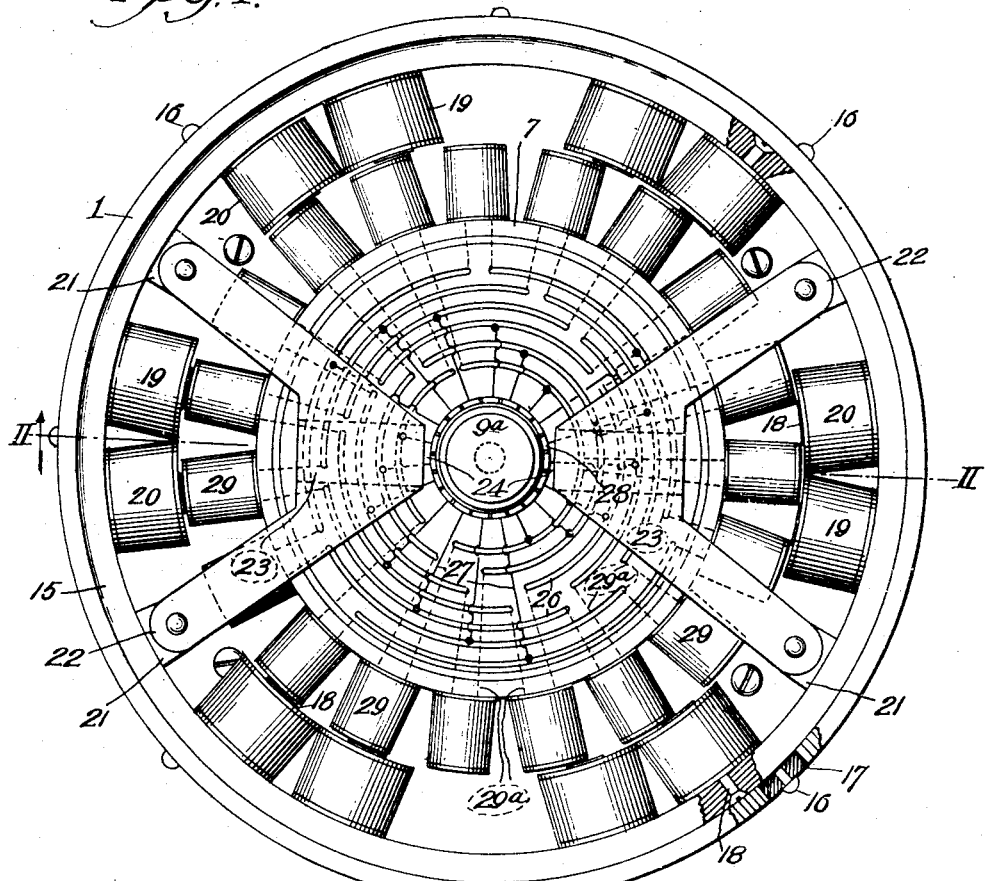
Figure 1 is a side elevation with the housing plate omitted, of an electric motor embodying the invention.

In the preferred construction, 1 indicates a drum-shaped casing, open at one of its sides and provided with a central internally threaded stud or boss 2 receiving a bushing 3. The bushing projects into the space within the casing 1 to form a hollow spindle 4. Journaled on the spindle 4 is a sleeve 5 formed adjacent the closed end of the casing with an annular flange 6, to which a second drum-shaped member 7 of smaller diameter and open at one side, is secured by bolts 8. The second drum 7 forms the spider or frame of a rotating armature as will hereinafter appear.

To hold the second drum in position, one end of sleeve 5 projects beyond the spindle 4 and is internally threaded for engagement with threads formed on a pin or shaft 9, having a head 9a, and projecting through the spindle 4 and equipped at its opposite end, externally of the closed end of the casing 1, with a power take off pulley or the like 10. The pulley is held to the shaft and the shaft is held against displacement by a series of lock nuts 11, threaded on the end of the shaft 9. Pressed or otherwise secured to the sleeve 5 and held by the head 9a, is a commutator 12 and a distributor disk 13, the disk here shown being in the form of a flat plate, which shape, however, depends on the motor design. It may obviously be of any desired shape as will hereinafter appear.

Rotatably adjustable within the casing 1 is a ring 15, held in position by bolts 16 passing through slots 17 in the casing 1. The ring 15 in the type of motor illustrated, carries a series of radially arranged bolts 18, each bolt being the core of a field coil, or the coils may be secured in any other manner. The coils are positioned in adjacent pairs as here illustrated, although they may be in triplex, quadruplex, etc., and although each separate coil may be of the same resistance, if desired. It has been found that by making the coils 20 (the rearward coils in the direction of rotation), of higher resistance than the coils 19, whereby by properly proportioning the resistance of the coils the entire stator windings may be connected in series with the rotor when operating on D. C., and then, when desiring to operate on A. C., one of the groups of field coils may be shunted to alter the resistance of the motor. If the parts are properly proportioned, the speed and power output will remain substantially the same with both types of current of the same voltage. The effect is to produce a universal motor by weakening the field strength when operating on A. C. Another method of accomplishing this result is shown in the patent to Lamme, No. 1,244,511, issued October 20, 1917.

Figure 10:
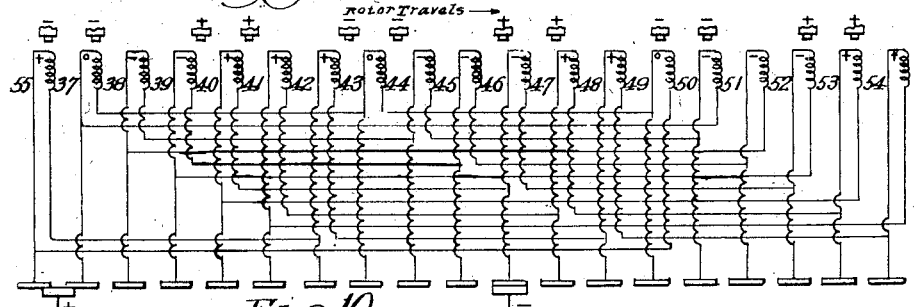
Figure 10 is a diagrammatic view of the motor with the stator, rotor and commutator segments as they will appear with brushes of the width of one commutator segment, the energization of the parts being also illustrated.
Figure 11:
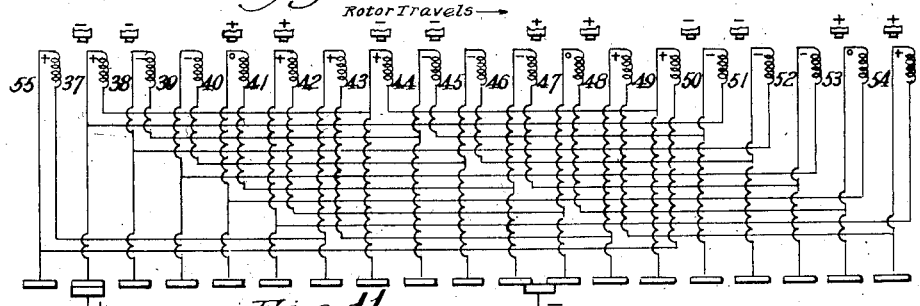
Figure 11 is a view similar to Figure 10, but shows the rotor just before it has turned to the position shown in Figure 10.

The brush carrying frame in the construction here illustrated, comprises two pairs of insulating members 21 secured to the inner face of the closed end of the casing 1, and a pair of V-shaped rigid conductor straps 22 carried by said insulating blocks 21, the adjacent ends of the straps being provided with sockets 23 from which spring-advanced brushes 24 project, said brushes in the preferred construction, as illustrated in Figures 10 and 11, being of sufficient width to simultaneously cover not more than one commutator segment.

The distributing insulating disk 13 is formed with a series of segmental slots in which are embedded or otherwise secured, suitable conducting straps or bars 26, each conductor being connected by a low resistance lead 27 to a commutator segment 28. Besides its connection to a commutator segment, each conductor 26 is also connected by wires 29a to the opposite ends of a pair of armature coils 29, arranged in radial positions around the circumference of the member 7. The flange of the armature spider 7 is provided with insulating bushed openings 30, through which the leads to the armature coils extend.

Figure 2:
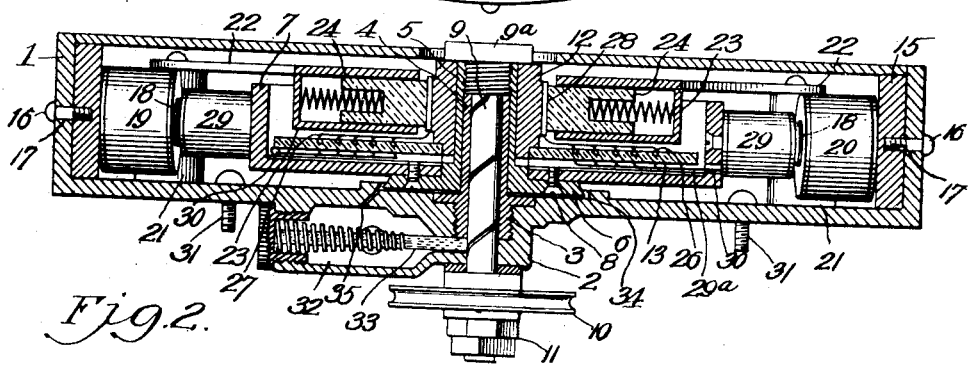
Figure 2 is a section on the line II—II of Figure 1.

The motor as illustrated, has nineteen armature coils and six pairs of independent field coils, each with its individual pole piece. The preferred direction of rotation is clockwise, although it is evident that the motor will run with equal facility in either direction. The motor may be secured in position to any suitable support by a series of bolts 31 projecting through its closed side, Figure 2.

To provide a permanent method of lubrication so that the motor may be operated for long periods of time without attention, the rear exterior face of the casing 1 carries an oil or lubricant well 32, and extending from said well into contact with the shaft 9 is a feed wick 33. The shaft 9 is spirally fluted to feed the oil outwardly between said shaft and the spindle 4, whence it returns between the external face of the spindle 4 and the sleeve 5, and is thrown out by centrifugal force into a circular chamber 34 formed on the inner face of the casing 1, and from thence returns by an opening 35 into the well or oil reservoir.

With the construction described, it is apparent that the entire armature may be removed from the open side of the drum 1 by the removal of the brushes and the withdrawal of the headed shaft 9, or that the field coils may be as readily removed by the withdrawal of the adjusting clamping bolts 16.

Figure 8:
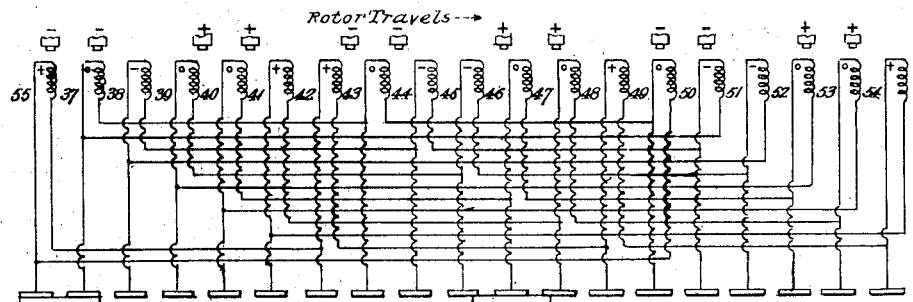
Figure 8 is a diagrammatic view of the motor with the stator, rotor and commutator segments as they will appear with brushes of the width of two commutator segments, the energization of the parts being also illustrated.

One type of armature connection is shown diagrammatically in Figure 8, the armature coils being respectively numbered 37 to 55 inclusive, with one of the brushes 24 connected to the positive side of a source of direct current and in contact with the commutator segments (which correspond in number to the number of armature coils), leading to coils 37 and 55, and the other brush 24 being connected to the negative side of the line and contacting with the commutator segments connected to coils 45, 46 and 47.

In the construction illustrated, where it will be noted the brushes are the width of two commutator segments, armature coils 37, 43, 49, 46, 52, 39, and 40, 53, 47 will be neutral or dead; coils 55, 42, 48, 54 and 41 will be positive; and coils 45, 51, 38, 44 and 50 will be negative.

Figure 9:
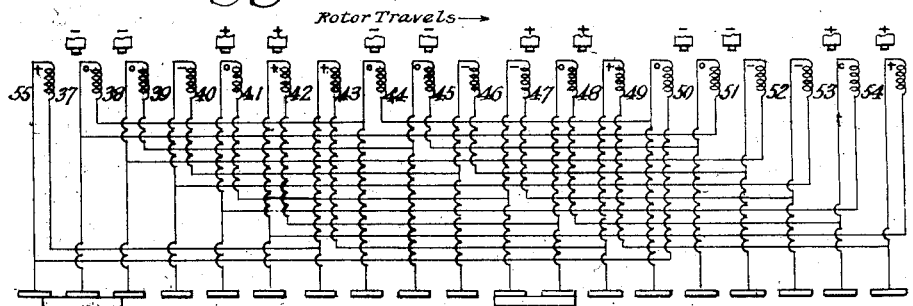
Figure 9 is a view similar to Figure 8, but shows the rotor just before it has turned to the position shown in Figure 8.

However, if the brushes shown in said figures are reduced to one commutator segment in width, it will be found that with the connections illustrated in Figure 10, armature coils 37, 43 and 49 are neutral, or just at the point of current reverse, while coils 38, 39, 44, 45, 46, 50, 51 and 52 are negative, and coils 40, 41, 42, 47, 48, 53, 54 and 55 are positive the current reverse always occurring in three coils simultaneously, it being understood that the position of the armature coils shown in Figure 1, corresponds to the diagrammatic position of said coils shown in Figures 8 and 10. In Figure 9 the rotor occupies a position just before it has turned to the position shown in Figure 8, and rotor coils 55, 41, 42, 48 and 54 are positive, coils 39, 45, 46, 51 and 52 are negative, and coils 37, 38, 40, 43, 44, 47, 49, 50 and 53 are neutral. In Figure 11, the rotor has not yet turned to the position shown in Figure 10, and the rotor coils 55, 37, 41, 42, 43, 48, 49 and 54 are positive, coils 38, 39, 44, 45, 46, 50, 51 and 52 are negative and coils 40, 47 and 53 are neutral.

For convenience in making various connections or hook-ups of the motor, the terminals of each set of coils on the field and of the rotor, are placed at an easily accessible location. The field coils 19 as illustrated may be connected in series as shown in Figure 5, each set of coils forming a separate series, and their terminals being respectively indicated at 60 and 61, for the coils 20, and 62 and 63 for the coils 19. The brushes are provided with suitable terminals (not shown), and it will be understood that each of the leads is properly insulated.

With the general type of construction here shown it will be evident that all of the coils are entirely independent of the other coils and that if a short circuit develops in any of the coils of the field or rotor, the entire coil may be readily removed by simply disconnecting its two terminals, and that a new coil may be as readily supplied. It will be further noted that a multiplicity of hook ups for the motor may be employed, the method of connecting the rotor coils through the distributor being used to advantage in manufacture, as coils of predetermined capacity may be made in standard sizes and standard distributor disks may be produced. When a motor of predetermined characteristics is desired, such stock of parts may be selected and the connections made on the distributor without having to produce special windings as required under present conditions for every type of motor.

In Figure 6, the motor is diagrammatically shown as connected in straight series for use on direct current. In Figure 7, it is shown in series-shunt for use on alternating current, the high resistance field coils being shunted around the low resistance field coils and the rotor. It is found that the pole strength is still substantially the same as all of the windings are being used, and the motor as thus connected in an A. C. circuit of the same voltage as in the D. C. connections, will produce substantially the same speed and power.

It is to be understood that while I have described what now appear to be the preferred embodiment of the invention, I reserve the right to all changes within the spirit of the invention, and without the ambit of the prior art.

I claim:—

1. In an electric motor, the combination of a rotating armature, a series of equi-spaced similar coils carried by said armature, and a field comprising a plurality of independent electro-magnets of the same polarity arranged in coacting groups to simultaneously affect the same armature coils, the independent coils of each group being of different electro-magnetic strength, said groups being equally spaced and every other group being of opposite polarity.

2. In an electric motor, the combination of a casing, a drum-shaped rotor, a series of field coils projecting inwardly from the inner periphery of the casing, a hollow bushing projecting into the casing in axial alinement therewith, a rotating armature journaled in said bushing, and a rotating headed shaft extending through the bushing and rotating with and retaining the armature in position.

3. In an electric motor, the combination of a drum-shaped casing, a series of radially arranged field coils projecting from the inner face of the casing, a bushing carried by the closed side of the casing and in axial alinement therewith, a drum-shaped armature spider journaled on the bushing, a series of armature coils carried thereby, a commutator in cooperative relation to the armature spider, and a distributing member interposed between the commutator and the armature spider and provided with connecting bars respectively connected to the commutator segments and to the armature coils.

4. In an electric motor, the combination of a drum-shaped casing, a series of field coils projecting inwardly from the inner periphery of the casing, a hollow bushing projecting inwardly from the inner face of the casing and in axial alinement therewith, a rotating armature journaled on said bushing, a spirally fluted rotating shaft extending through the bushing and retaining the armature in position, a lubricant container carried by the exterior side of the drum, means to feed lubricant to the fluted shaft, a lubricant discharge passage between the inner side of the drum and the armature, a circular recess in the inner face of the drum to catch the discharged lubricant, and a drain passage from said groove to the lubricant container.

JOHN D. MacLACHLAN.